United States Patent
Njølstad (10) Patent No.: US 7,339,684 B2
(45) Date of Patent: Mar. 4, 2008

(54) PROXIMITY DETECTOR

(75) Inventor: Tormod Njølstad, Trondheim (NO)

(73) Assignee: New Index AS, Trondheim (NO)

( * ) Notice: Subject to any disclaimer, the term of this patent is extended or adjusted under 35 U.S.C. 154(b) by 89 days.

(21) Appl. No.: 10/579,334

(22) PCT Filed: Nov. 12, 2004

(86) PCT No.: PCT/NO2004/000347

§ 371 (c)(1),
(2), (4) Date: May 15, 2006

(87) PCT Pub. No.: WO2005/050130

PCT Pub. Date: Jun. 2, 2005

(65) Prior Publication Data

US 2007/0127039 A1    Jun. 7, 2007

(30) Foreign Application Priority Data

Nov. 19, 2003   (NO) ................... 20035142

(51) Int. Cl.
G01B 11/14    (2006.01)
(52) U.S. Cl. ..................... 356/614; 356/624
(58) Field of Classification Search .......... 356/614, 356/624, 4.07; 250/559.29
See application file for complete search history.

(56) References Cited

U.S. PATENT DOCUMENTS 4,639,140 A    1/1987 Lerat
4,752,799 A * 6/1988 Stauffer ................ 396/109
7,083,100 B2   8/2006 Njolstad

FOREIGN PATENT DOCUMENTS

| DE | 3235028 A1 | 3/1984 |
| DE | 3338807 A1 | 5/1985 |
| DE | 4013743 A1 | 11/1991 |
| DE | 2448898 C1 | 5/1998 |
| EP | 0281085 A2 | 9/1988 |
| NO | 311740 B1 | 1/2002 |
| WO | 9219984 A1 | 11/1992 |
| WO | 0227461 A1 | 4/2002 |

* cited by examiner

Primary Examiner—Roy M. Punnoose
(74) Attorney, Agent, or Firm—Rothwell, Figg, Ernst & Manbeck, P.C.

(57) ABSTRACT

Apparatus for detecting proximity between a first object (target object) and a second object (reference object), comprising a light source and a light detector adapted to receive resulting back-scattered light from the reference object when illuminated from the light source, whereby the intensity of back-scattered light to the light detector is utilized as a measure of said proximity. The target object comprises an optical device having a focal plane and being adapted to be illuminated by the light source. The axes of the light rays from the light source and the back-scattering to the light detector have mutually closely adjacent and substantially parallel or coincident portions. Said proximity corresponds to a distance (relative position) between the target object and the reference object wherein the reference object is located substantially at the focal plane.

12 Claims, 7 Drawing Sheets

PROXIMITY DETECTOR

CROSS REFERENCE TO RELATED APPLICATION

This application is a 35 U.S.C. § 371 National Phase Entry Application from PCT/NO04/00347, filed Nov. 12, 2004, and designating the United States.

BACKGROUND OF THE INVENTION

1. Field of the Invention

The invention relates to an apparatus that can detect when one or more target objects are in vicinity of their respective reference surfaces or reference objects.

The invention also relates to a detection system that can cooperate with the apparatuses and can determine when one or more target objects are in vicinity of their respective reference surfaces or reference objects.

Moreover, the invention relates to a method for determining when one or more target objects are in the vicinity of their respective reference surfaces or reference objects.

There are today several known methods for determining whether a target object is in the vicinity of a reference surface or other reference object.

Proximity detection is of interest, inter alia, in industrial, automotive and avionic systems. By means of proximity detectors the systems can report their own position relatively to reference objects and report conditions, as for example to determine the condition of valves (open, closed) provided with such proximity detectors. In automatic or autonomous systems the systems can themselves respond to the conditions of proximity detectors and other sensors, by changing speed or velocity direction, and possibly perform a series of different operations depending upon the state of the system as a whole.

In general proximity detectors have the property that there is no requirement for physical contact between the said target object and the said reference object in order to determine that the two are close to each other. In some cases it is also decisive that there is no requirement for physical contact between the detector system and one or more of the two said objects, and that proximity detection accordingly is obtained by remote sensing. It may also be decisive that the equipment on the two said objects does not require any electrical or other energy. Moreover, it can be decisive that the equipment has a low weight. Besides it may be decisive that the equipment is simple and inexpensive to manufacture. In many cases it may be important that the equipment does not require any maintenance. Furthermore it is often important that the equipment or the measuring method does not have any influence on the target object or environments, for example by disturbing electric or magnetic fields. In use of medical equipment there will be a strict requirement that the equipment does not hurt the patient. The present invention satisfies all the above aims.

2. Description of the Related Art

A number of different proximity detector principles are known, for example based on ultra sound propagation distance measurement etc. (U.S. Pat. No. 6,114,950, DE3235028, U.S. Pat. No. 5,144,593), triangulation with visible or invisible light (W09219984), optical differential phase measurement (U.S. Pat. No. 4,752,799), fibre optic sensors (U.S. Pat. No. 6,498,654), laser-based principles (DE2448898), magnetic principles (U.S. Pat. No. 6,127,821, U.S.2003173957) etc.

U.S. Pat. No. 5,200,604 describes an optical proximity detector for a probe in a laser scalpel device. The proximity detector consists of a light source, a light conductor leading the light out to an output aperture and a light detector receiving light via a light conductor to an aperture in the vicinity of the output aperture. Proximity to a reference surface is calculated from the reflected light intensity. The purpose is to avoid the activation of a laser scalpel before there is contact with the tissue in which there is to be cut.

U.S. Pat. No. 4,991,509 describes a method and an apparatus for determining the spacing between an object and a reference surface. The proximity detector consists of a light source, a light conductor leading the light out to an output aperture, and a light detector receiving light via a light conductor to an aperture in the vicinity of the output aperture. The two apertures are spaced at a certain distance from each other so that the light cone emitted overlaps to a larger or smaller degree the field of view captured by the light detector through the input aperture. Proximity to a reference surface is calculated from the reflected light intensity.

The two patents U.S. Pat. No. 5,200,604 and U.S. Pat. No. 4,991,509 describe proximity detection by means of a principle wherein source and detection have a certain mutual spacing so that the light cone from the light source and the field of view of the light detector will cover a common volume or a common area on the reference object, that will vary depending upon the spacing between the target object and the reference surface, thereby representing a varying back-scattered light intensity. In contrast to the present invention, these patents do not comprise any lenses or curved mirrors with associated focal lengths that define the proximity detection. The patents do not describe any devices wherein the light cone of the light source and the field of view of the light detector are coincident; on the contrary a specified lateral spacing is required between the two apertures so that the light cone and the light detector will have a partially overlapping coverage area that in turn depends on the distance to the reference surface and where this variable overlap area gives a varying back-scattered light intensity that can be measured in the light detector. Thus, a prerequisite in the two patents is a lateral distance between input aperture and output aperture in order that the devices shall operate properly, whereas the present invention does not involve the requirement that input aperture and output aperture shall be separated by a lateral distance.

SUMMARY OF THE INVENTION

In the present invention the said target object and the said reference surface or reference object will be illuminated completely or in part by light, and this light has a spectrum within or outside the visible range. The light detector can be a camera with subsequent analogue and/or also digital signal processing and/or also digital image processing, or in a simpler embodiment can be composed of one or more optical photo detectors with associated detection electronics. The said illumination can be pulsed or modulated in order to be distinguished from other illumination, and such modulation can also be synchronised with the light detection.

BRIEF DESCRIPTION OF THE DRAWINGS

In the following the invention shall be explained more closely with reference to the accompanying drawings, wherein.

DETAILED DESCRIPTION OF THE INVENTION

Figure 1:
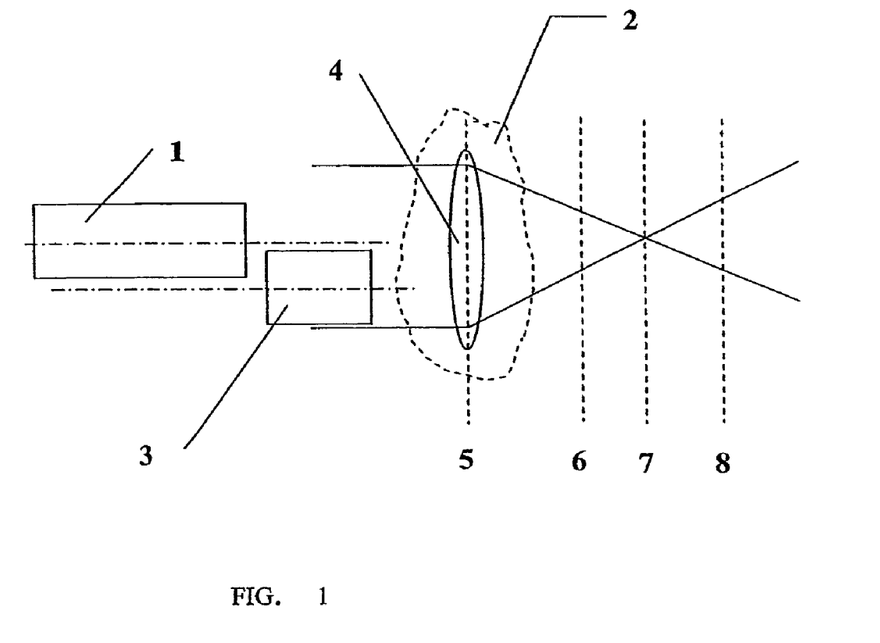
FIG. 1 illustrates an embodiment of the proximity detector.

FIG. 1 shows an embodiment of the proximity detector. The said illumination source 1 and the said light detector 3 will have the most possible adjacent and the most possible parallel axes directed towards the target object 2, whereas the target object will be provided with a convex lens 4 (consisting of one or more lens elements, or in the alternative a sphere or a cylindrical rod) or a concave mirror (or a group of several mirrors with different curvatures), representing a specified focal length 7. Proximity detection is obtained when such a lens-mirror configuration on such a target object has a distance to such a reference surface or reference object that corresponds to this specified focal length 7, whereas the light is back-scattered to a small degree through the said lens mirror at a larger distance 8 or a shorter distance 6. The reference surface 6, 7, 8 or the reference object should have a certain reflectivity so that not all incident light will be absorbed. Under such conditions proximity between the target object and the reference surface or the reference object can be detected in that said lens-mirror arrangement lights up, since the incident light from the illumination source through the lens-mirror arrangement is back-scattered from the reference surface or the reference object to the said detector through the lens-mirror arrangement because the distance between the lens-mirror arrangement of the target object and the reference surface is corresponding. By comparing the light intensity level with a fixed or dynamic reference level, it is possible to detect that the said light intensity level under these conditions as mentioned, has become higher. The reference level can be static, dynamic or adjustable based on measurements. If the illumination is modulated and/or also has synchronized detection, there will be a reduced possibility for random other illumination to result in false detection.

As a "receiver" (light detector) there may be contemplated a human eye (the operator's vision) instead of a camera or the like, the receiver arrangement being in such case designed for cooperation with an eye of the operator or user.

Figure 3:
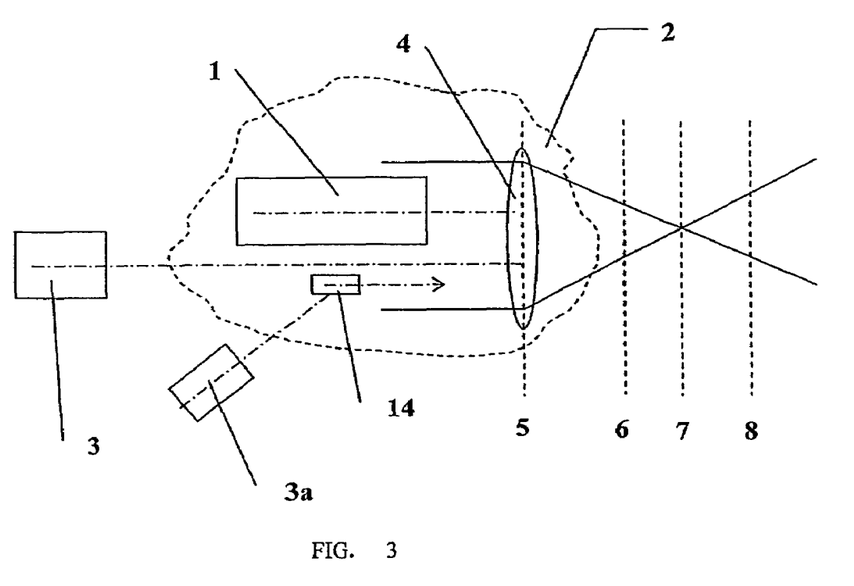
FIG. 3 illustrates an embodiment in which the light source is associated with the target object.
Figure 4:
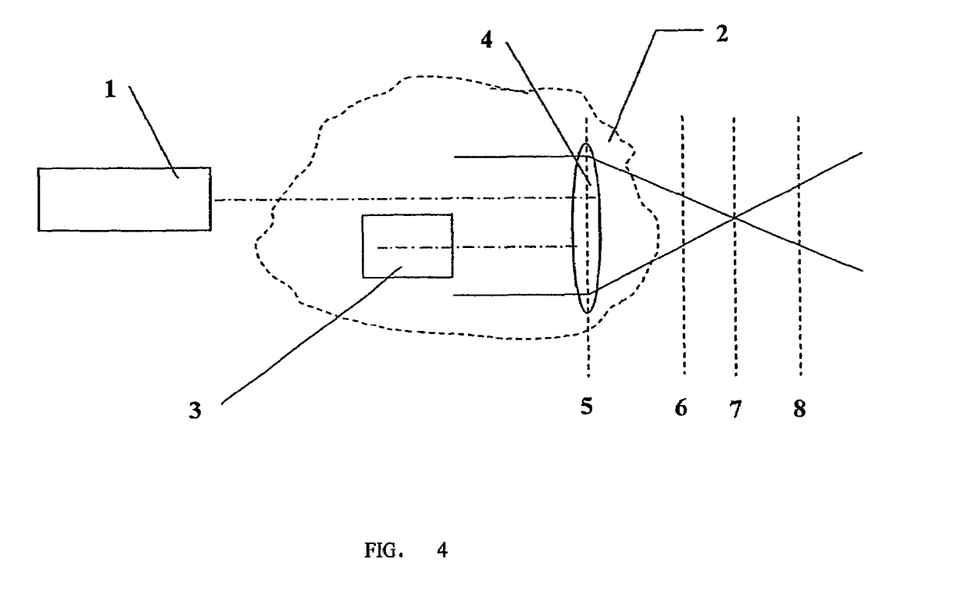
FIGS. 4-7 show various modifications of embodiments according to the invention.
Figure 5:
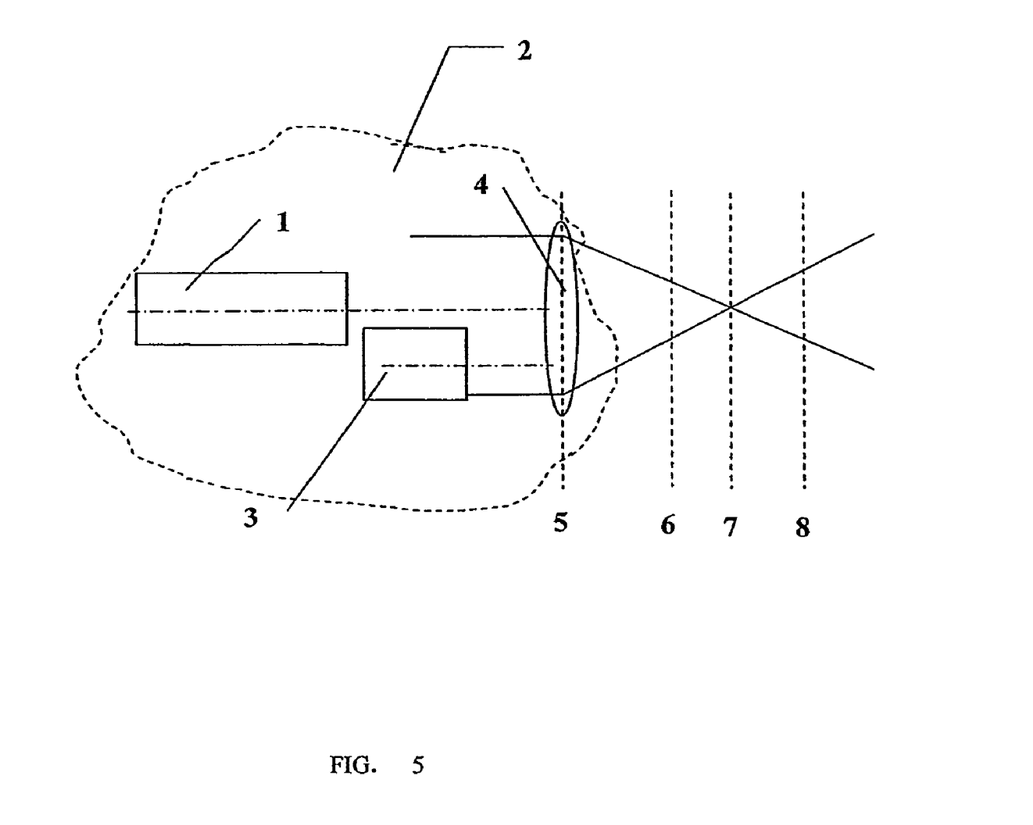
Figure 6:
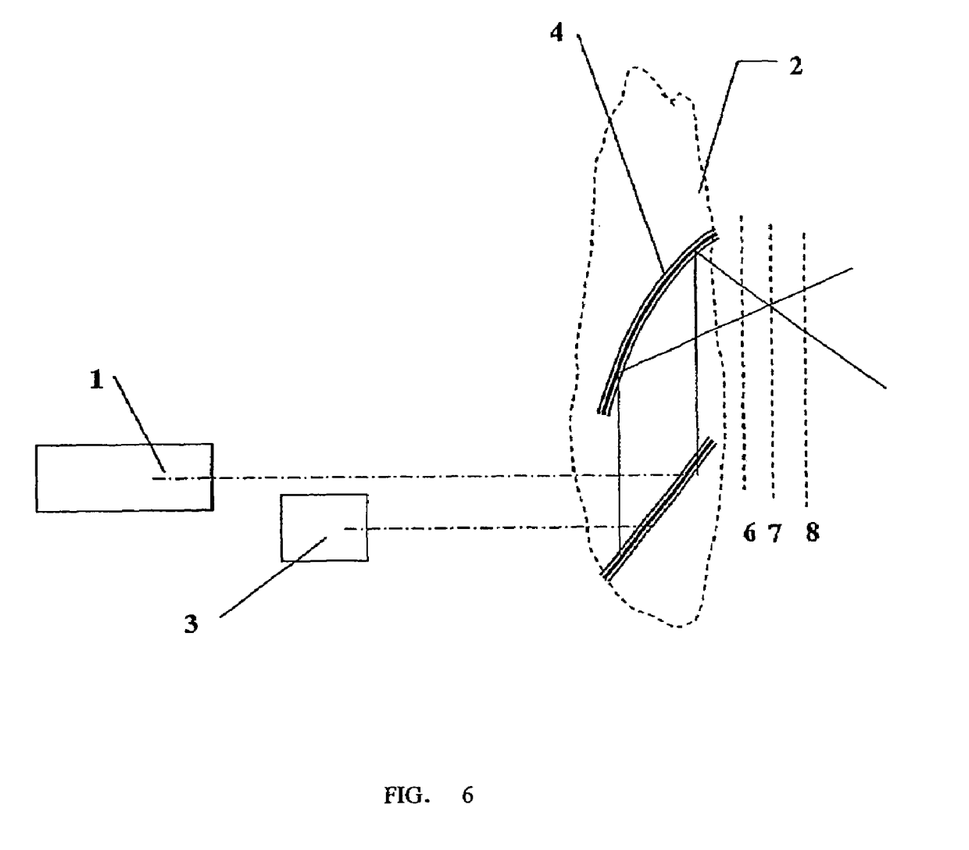
Figure 7:
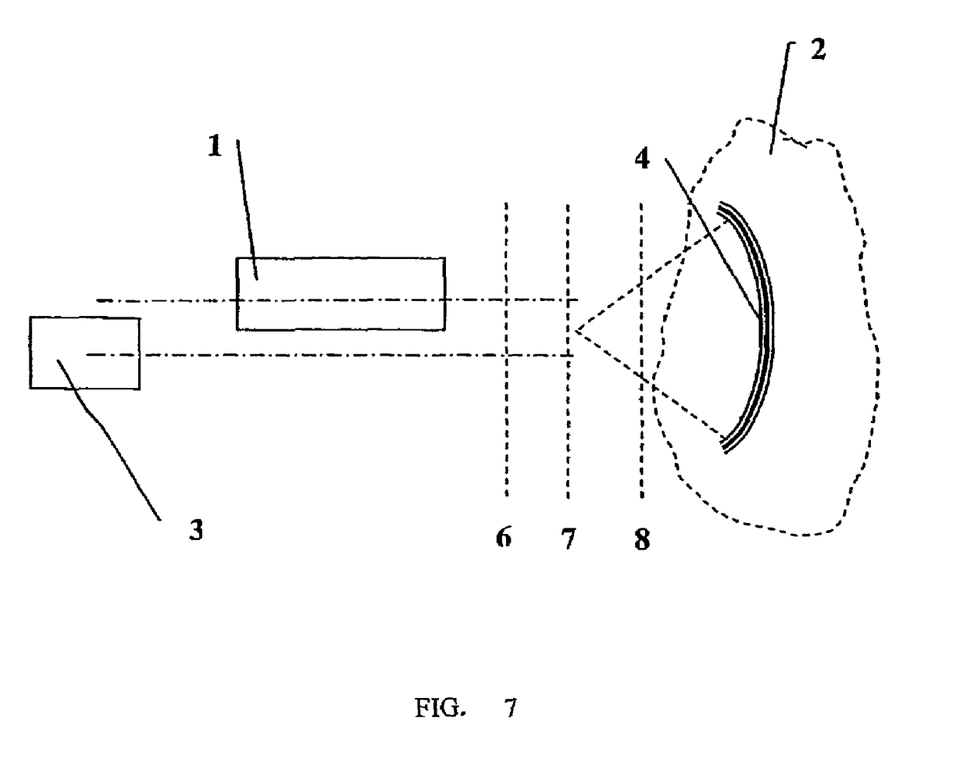

In a preferred version the solution proposed will only have said lens-mirror arrangement or device mounted on the target object, whereas the illumination source and the detector are separated from the target object and the reference object. Moreover this illumination source and this detector can be separated from each other, as long as the detector is positioned at the axis of the back-scattered light from the lens-mirror arrangement. In another preferred version as illustrated in FIG. 3, the illumination source 1 can be located on the target object 2 whereas the light detector 3 can be located at another stationary or movable point. In a third preferred version as illustrated in FIG. 4 the detector 3 is located on the target object 2 whereas the illumination source is located at another stationary or movable point. In a fourth preferred version as illustrated in FIG. 5 both the detector and the illumination source are located on the target object. In a fifth preferred version as illustrated in FIG. 6 a concave mirror 4 is employed as a focusing optical element located on the target object 2. In a sixth preferred version as illustrated in FIG. 7 a concave mirror 4 is used as a focusing element located on the target object 2, and the target object is placed on the opposite side of a diffusing screen in relation to the light source and the detector. It is also possible to change the axis direction of the light detector in relation to the axis direction of the illumination source, by means of an extra mirror and/or other optical elements. See variants 3a-14 in FIG. 3.

Figure 2:
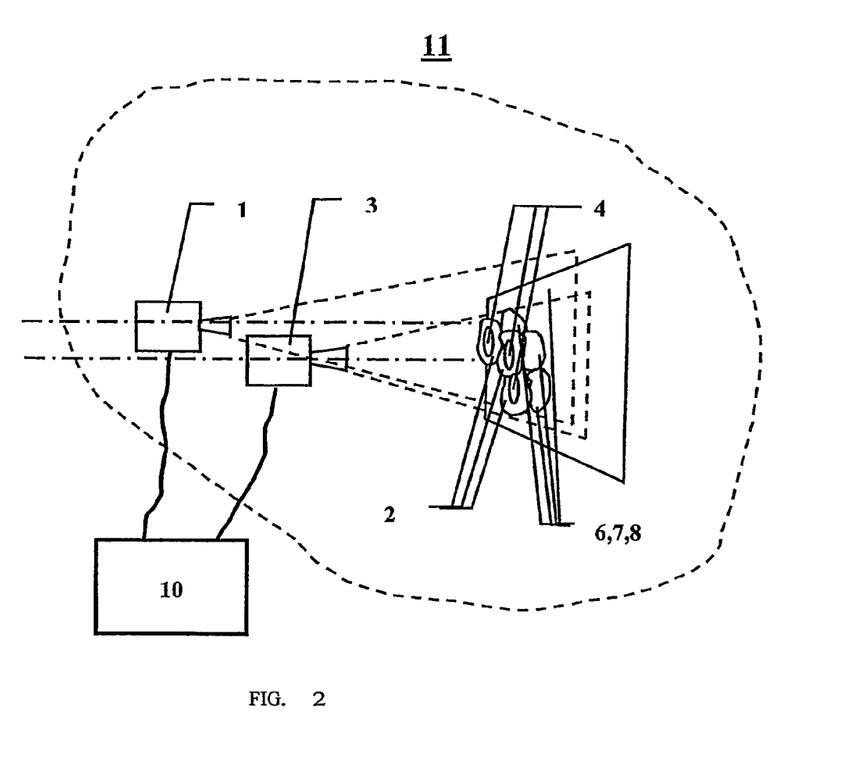
FIG. 2 illustrates an embodiment of a system of proximity detectors having a common light source and common light detection with a camera and computer or a similar digital system for image acquisition, data processing, presentation, communication and operation of related software.

An embodiment of a system for proximity determination and/or also position determination 11 for use together with one or more devices 9 that make it possible to detect when one or more target objects are in the vicinity of their respective reference surfaces 6, 7, 8 or reference objects 6, 7, 8, is illustrated in FIG. 2. In this embodiment there is one or a plurality of proximity detectors having a common light source and common light detection by means of a camera, and a computer or similar digital system for image acquisition, data processing, presentation, communication and implementation of related software. Analogue and/or digital signal processing of the image pixels will often be necessary in order to obtain a reliable proximity detection, where also different reference levels are used and can also be estimated.

The invention relates to the general principle of proximity detection. As described above proximity detectors can have significant industrial possibilities within various fields of use. Application of new low cost camera technology and other modern optical solid-state sensors together with modern illumination sources such as lasers, laser diodes and light emitting diodes etc. that can readily be modulated or pulsed, give the principles a great use and profit potential. The uses can be where the dimensions to be monitored are large or where the distances are in the millimetre or micron range.

In general the invention may be employed together with means for lateral position determination and determination of the orientation of target objects. The invention can be used together with the positioning and orientation principles of Norwegian patent No. 311740 and PCT patent PCT/NO01/00369 in general cases where it is desired to detect the positions and/or also the orientations of one or more target objects in the observation plane and at the same time also determine proximity to one or more reference objects and/or also determine various details with respect to the condition of the objects. PCT patent PCT/NO01/00369 also in general covers the operation of position determination and/or also to find the orientation of one or more marked target objects in an area or observation space, and with a plurality of recordings also be able to calculate the direction of movement and velocity of the target objects.

An example of an interesting particular use of the invention, is proximity detection of writing and pointing tools being employed in connection with data projectors. Such a system, that employs camera-viewing systems as a sensor and a data projector as illumination source, is described in Norwegian patent 311740 and in PCT patent PCT/NO01/00369, the patenting of which has been extended to USA and Europa. These patents describe both a system for pointing, drawing and writing in the data projector image and description of possible designs/principles of the drawing, writing and pointing tool and its properties, where such a tool is provided with a tip having a visual pattern with code-theoretically good patterns for good position determination in the projector image plane. These patents also cover various forms of activation principles as for example proximity detection on direct mechanical contact with the writing surface. These patents do not cover proximity detection principles as described herein. As mentioned the novel principle for proximity detection may also be employed alone or in combination with various principles for lateral or space-related position and orientation determination of this drawing, writing and pointing tool. A combination of the invention with the positioning and orientation arrangement of Norwegian patent 311740 and PCT patent PCT/NO01/00369 as explained in the preceding paragraph, is employed in general where it is desired to detect the position of one or more target objects and also determine proximity to reference objects and/or determine the condition of the objects. In particular this combination of the proximity detector described, with one or both of the two above patents, may form the basis for a pointing, drawing and writing tool having a particular robust detection and a very high profit potential. Moreover, this combination in general may give a robust proximity detection as well as position and orientation recording of a number of marked objects in an area.

The invention may also be employed as a proximity detector in such a drawing, writing and pointing tool even if the principles for position determination and/or also orientation determination in the projector image plane according to the two above patents, are not utilized. The invention can also be used as a independent method or combined with one or more other methods of position determination.

One of several preferred embodiments may be as shown in FIG. 2, but where the light source is a data projector and the light detector is a camera with digital detection electronics that is located adjacent to the data projector and with its axis as close as possible to parallel to the axis of the data projector. In a preferred embodiment the camera with its digital detection electronics is incorporated in the data projector. The system of FIG. 2 will be able to detect whether interaction means such as for example a drawing, writing or pointing tool is spaced from or is closely adjacent to the writing surface (for example a wall, a table, a board, a rear projection screen). The system on FIG. 2 may also detect whether buttons or other adjustments of the drawing tool have be depressed or activated in another manner, by detecting distance/proximity between related target objects and reference objects.

Also proximity detection as described above, but where the light source is not necessarily a data projector, but an independent constant, pulsed or modulated light source with visible or invisible light, can supplement such systems in order to make these more robust and redundant.

Proximity detection in the case of rear projection, where the projector and camera and possibly an auxiliary light source as described above, are located behind the projection screen, and where the projection screen is of the diffusing type, can for example utilize the preferred embodiment as shown in FIG. 7.

The invention relates to proximity detection and position determination. Proximity detection has generally an interest at many fields of use. Optical proximity detection based on the principle described, is particularly attractive since new camera technology and other modern optical sensors and illumination sources have become available. Also confocal microscopy should be mentioned, where the ray path for illumination (typically a laser) and to the light detector goes through the same lens system before and after incidence on the object to be microscoped.

The invention makes possible the separation of the light detector and/or the light source from the target object and the reference object. Thus, the invention makes it possible by remote sensing to determine whether the target object and the references object are adjacent to each other. Also conditions of the target object can be interrogated by means of such remote sensing.

Whereas several illustrative embodiments of the invention have been shown and/or described, there are of course a high number of variations and alternative embodiments being possible for experts in the field, while limitations of such variations and modifications are only related to the invention as it is stated in the claims.

The invention claimed is:

1. Apparatus for detecting proximity between a first object (target object) and a second object (reference object), comprising a light source (1) and a light detector (3) adapted to receive resulting back-scattered light from the reference object when illuminated from the light source (1), whereby the intensity of back-scattered light to the light detector (3) is utilized as a measure of said proximity, characterized in that the target object (2) comprises an optical device (4) having a focal plane (7) and being adapted to be illuminated by the light source (1), that the axes of the light rays from the light source (1) and the back-scattering to the light detector (3) have mutually closely adjacent and substantially parallel or coincident portions, and that said proximity corresponds to a spacing (relative position) between the target object (2) and the reference object (6,8) wherein the reference object is located substantially at the focal plane.

2. Apparatus according to claim 1, wherein the light source (1) and/or the light detector (3) are/is located on the target object (2).

3. Apparatus according to claim 1, wherein said axes outside said portions have deviating directions, such as by using mirrors, optical fibres or light conductors.

4. Apparatus according to claims 1, wherein the light source (1) is adapted to emit modulated or possibly pulsed light, and the light detector (3) is synchronized with such modulation or pulsing.

5. Apparatus according to claim 1, wherein the light detector comprises a camera (3).

6. Apparatus according to claim 1, wherein the optical device (4) has at least two focal planes for determination of said proximity in at least two relative positions of the target object (2) and the reference object (6,8).

7. Apparatus according to claim 1, wherein the intensity of back-scattered light to the light detector (3) is compared with a predetermined and preferably adjustable level, for detection of said proximity.

8. Apparatus according to claim 1, wherein the light source (1) and the light detector (3) are located separately in relation to one another.

9. Apparatus according to claim 1, wherein the light source consists of a data projector (FIG. 2).

10. Drawing, writing and/or pointing tool for data presentation, computer-supported work or interactive operations with a computer, wherein an apparatus according to claim 1 is incorporated in the tool.

11. Apparatus for detecting proximity between a first object (target object) and a second object (reference object), comprising a light source (1) and a receiver for resulting back-scattered light from the reference object when illuminated from the light source (1), whereby the intensity of back-scattered light to the receiver is utilized as a measure of said proximity, characterized in that the target object (2) comprises an optical device (4) having a focal plane (7) and being adapted to be illuminated by the light source (1), that the axes of the light rays from the light source (1) and back-scattering to the receiver have mutually closely adjacent and substantially parallel or coincident portions, that said proximity corresponds to a distance (relative position) between the target object (2) and the reference object (6,8) wherein the reference object is located substantially at the focal plane, and that the receiver is adapted to cooperate with an eye belonging to a user of the apparatus.

12. Apparatus according to claim 11, wherein the light source consists of a data projector.

* * * * *